Patented Feb. 21, 1950

2,498,453

UNITED STATES PATENT OFFICE 2,498,453

POLYVINYL CHLORIDE COMPOSITIONS CONTAINING SULFURIC ACID TREATED HIGH-BOILING PETROLEUM EXTRACT

August A. Schaerer, El Cerrito, Calif., assignor to Shell Development Company, San Francisco, Calif., a corporation of Delaware No Drawing. Application July 23, 1945, Serial No. 606,709

4 Claims. (Cl. 260—31.8)

This invention relates to plastic compositions containing polyvinyl chloride. More particularly, the invention is concerned with compositions of matter containing polymers of vinyl chloride which are plasticized with treated petroleum products.

Polyvinyl chloride as well as copolymers predominantly from vinyl chloride are inherently of very brittle character. By incorporating various compounds and substances with the polymers, compositions can be obtained which have suitable plasticity and flexibility so that they find many useful applications. However, owing to the very brittle nature of the polymer, it is necessary to incorporate a large proportion of plasticizer with the polymer in order to obtain the desired degree of flexibility. Thus, it is customary to use 0.8 to 1 part by weight of plasticizer per part of polyvinyl chloride. The plasticizer compounds suitable for use with polyvinyl chloride such as organic esters and the like are somewhat expensive and since such heavy loading with plasticizer is necessary, many uses which would be possible because of the attractive properties of the compositions are prohibited by the high cost factor contributed by the large amount of plasticizer needed in the compositions. Cheaper plasticizing materials have been sought to replace the high boiling esters. Petroleum and products therefrom are in general very cheap in relation to the cost of ester plasticizers, and investigations have been made heretofore seeking to find petroleum products which would be satisfactory as plasticizers for polyvinyl chloride.

Prior to my invention it was proposed that polyvinyl chloride be plasticized with high boiling Edeleanu extracts of petroleum. It has been found, however, that polyvinyl chloride compositions plasticized with such Edeleanu extracts suffered a serious defect which barred their utility for most purposes. While the Edeleanu extract is compatible with polyvinyl chloride and homogeneous compositions can be obtained which have excellent flexibility when first prepared, they become brittle and lose their flexibility upon the passage of time. This tendency to become brittle upon aging is not due to loss by evaporation of the extract plasticizer from the compositions; rather, it is due to some change which occurs in the extract during the course of time. Because the compositions do not retain their original flexibility, they have virtually no commercial utility.

I have now discovered that by subjecting Edeleanu extract to a special treatment, a product can be obtained, which when used to plasticize polyvinyl chloride, gives a composition which does not lose flexibility and become brittle on aging. The treatment comprises subjecting the extract to contact with a strong mineral acid whereby substances responsible for the instability are removed. The exact nature of the substances removed by the treatment is not known. Edeleanu extracts of petroleum are very complex mixtures of compounds which are predominantly hydrocarbons, although compounds containing oxygen, nitrogen and sulfur are also present. It was found that the acid treatment effected an appreciable reduction in the nitrogen content of the extract. Since many nitrogen-containing compounds such as amines are known to be stabilizers, it was surprising and unexpected that a treatment which removed nitrogen compounds would overcome the instability of the extract.

The petroleum products which are acid-treated and used in the compositions of the invention are high boiling extracts of petroleum. The extracts are obtained by extracting petroleum with solvents having preferential seelctivity for aromatics and naphthenes. To obtain such extracts, various non-reactive, highly polar, aromatically preferential solvents are used such as liquid $SO_2$, phenol, cresylic acid, furfural, beta,beta-dichlorethyl ether, nitrobenzene, and the like. Combination solvents like phenol with cresylic acid, or liquid $SO_2$ with benzene or toluene are sometimes used. The use of the so-called Duo-Sol double solvent process employing mutually immiscible solvents like cresylic acid and propane also gives suitable extracts. Reactive solvents like $H_2SO_4$ give extracts which are of entirely different character from those obtained with non-reactive solvents. The sulfuric acid extracts are highly unstable materials and, consequently, are unsuitable as a source of the plasticizing material. Particularly suitable materials for acid treatment and use as plasticizer are Edeleanu extracts of petroleum distillates, i. e. extracts obtained by use of liquid $SO_2$ or liquid $SO_2$ in combination with benzene, etc. The extracts are high-boiling materials which range in general from viscous liquids to tar-like materials at ordinary temperature. For use as plasticizers in the composition of the invention, extracts boiling above 300° C. at 760 mm. Hg pressure are employed. There is little change in properties of the plasticized compositions with increasing boiling temperature of the extracts above 300° C. at atmospheric pressure, although it is desirable to employ extracts boiling below about 400° C. at 1 mm. pressure. The extracts can be from naphthenic or aromatic crudes and those from naphthenic California and Gulf Coast crudes are very suitable. Extracts obtained in solvent refining of petroleum for manufacture of lubricating oils are available in large quantities and are well suited for the purpose of the invention, especially those wherein fractions of bulk distillate are subjected to solvent refining. Extracts derived in this manner which boil from about 125° C. to 300° C. under 1 mm. Hg pressure are particularly preferred.

The petroleum extracts are treated with a strong mineral acid in order to obtain a product which when employed as plasticizer for the polyvinyl chloride or copolymers thereof gives a composition having little tendency to become brittle and inflexible. Sulfuric acid is preferred for this purpose although other strong mineral acids such as phosphoric, hydrochloric or hydrobromic acid can also be used. The acid can be used in either concentrated or dilute form. While excellent results are obtained with dilute aqueous acid, it has been found that lesser amounts of acid are needed to obtain equivalent effect when concentrated acid is used, and consequently, the use of concentrated acid is preferred. Sulfuric acid of about 90 to 100% strength is particularly suitable.

The extracts are very viscous to semi-solid materials and in treating them it is preferable to use a solution of the extract in a light hydrocarbon. The extract is dissolved in a sufficient quantity of the hydrocarbon solvent so a solution of sufficient fluidity and mobility is obtained that the treatment with the acid is facilitated. However, excessive dilution with the hydrocarbon solvent is avoided since the acid treatment is more efficient with less dilute solutions. Ordinarily a solution of about 1 to 2 volumes of solvent per volume of extract gives proper fluidity and viscosity so that efficient treatment can be effected. The hydrocarbon solvent is separated from the extract after treatment and consequently a solvent is used having substantially lower boiling point or range than the extract so as to enable it to be readily removed by distillation after the acid treatment. A hydrocarbon solvent having a final boiling point not greater than about 600° F. is suitable. Various petroleum distillate fractions or other hydrocarbons can be used for this purpose such as straight-run gasolines, naphtha, kerosene, octanes, hexanes and the like.

In executing the acid treatment, the acid is added to a solution of the extract and the mixture is agitated so as to thoroughly commingle the acid with the extract. The agitation can be effected in a conventional manner with a stirring device or by bubbling air through the mixture. The acid sludge which forms during the treatment is permitted to settle and is withdrawn from the extract solution. In some cases the acid sludge is substantially solid in character and the extract is separated therefrom by decantation.

The amount of acid used in the treatment will vary with the particular acid employed, the strength of the acid, the particular extract being treated, and the extent of treatment desired. With concentrated sulfuric or phosphoric acid excellent results are obtained by treatment with 15% to 30% of acid based on the weight of extract. With more dilute acid such as 50% sulfuric acid, as much as 100 to 150% of acid may be needed. While the extract can be contacted with the total amount of acid in a single treatment, it is ordinarily preferred to divide the acid into several portions and successively contact the extract with the portions. Thus, in treating the extract with a total amount of 20% of sulfuric acid, for example, the extract is mixed with one-fourth of that amount or 5% of the acid, the formed acid sludge is separated, and the treatment is repeated three additional times with the remaining portions of fresh acid.

Also the acid treatment is ordinarily effected at moderate atmospheric temperature in the neighborhood of 20° C. although the extract can be treated at higher or lower temperatures if desired. The use of elevated temperatures up to 65° C. or 100° C. may be desirable in some cases.

After contacting the extract with the strong mineral acid and separating the formed acid sludge, it is usually preferred to further contact the extract with a basic agent to insure that no free acid or formed compounds with the acid remain in the extract. For this purpose, any agent capable of neutralizing strong acids is suitable such as sodium hydroxide, potassium hydroxide, calcium hydroxide, quicklime, sodium carbonate or bicarbonate, potassium carbonate, magnesium hydroxide and the like. The treated extract can be neutralized by contact and agitation with an aqueous solution or suspension of the basic agent.

Although contact with the basic agents effects neutralization of the acid-treated extract, it is preferred to contact the extract with an adsorbent bleaching clay of the type used in refining petroleum lubricating oils. One of the things effected by contact of the extract with the strong mineral acid is that salts are formed between the acid and nitrogen-base compounds contained in the extract. These salts, upon being contacted with the basic neutralizing agents, release the nitrogen-base therefrom and the nitrogen-base reverts back into solution in the extract which is not desirable. By contacting the acid-treated extract with an adsorbent clay, the salts are removed from the extract as such and there is no release of nitrogen compounds therefrom. Various adsorptive clays are useful for removing the substances from the acid-treated extract such as diatomaceous earth, kieselguhr, fuller's earth, Attapulgas clay, Florida clay, bentonite, and the like. Absorbent clays like those from montmorillonite and bentonite which have been activated in the usual manner by treatment with acid are particularly suitable.

Treatment with the adsorbent clays gives best results at an elevated temperature of about 75° C. to 200° C. Since the extracts are mobile at these temperatures and because the clay treatment is more efficient when undiluted extract is used, it is preferred to remove the hydrocarbon solvent used in the acid-treating step before subjecting the extract to further treatment with the clay. The removal of the diluent solvent is easily effected by simple distillation. The extract can be contacted with a powdered form of the clay and then the clay is removed from the mixture by filtration. Excellent results are realized by the use of 5 to 20% of clay based on the amount of extract being treated.

The acid treatment of the extract in some manner stabilizes it so that the plasticized compositions have improved resistance toward development of inflexibility and brittleness. Furthermore, the treated extracts are lighter in color which is an additional advantage. As stated hereinbefore, the exact reasons why the extracts are improved by the acid treatment are not known, but it was found that the acid treatment effected a substantial removal of nitrogen-containing compounds. It is therefore desirable that the extract be treated with sufficient acid so that a substantial reduction of nitrogen-containing compounds present in the extract is effected. The nitrogen content of the extract should be reduced to at least about 60% of the amount before treatment, and preferably to 10 to 20% of the value.

The resinous component of the compositions of the invention is a polymer of a vinyl halide such as vinyl bromide, vinyl chloride, or vinyl fluoride, including copolymers thereof with other polymerizable compounds, i. e., thermoplastic polymers composed essentially of vinyl halide units and containing only the amount of halogen contained in the polymer as formed by the polymerization of the monomer units. Of these, the most practical compositions are obtained with polyvinyl chloride or copolymers of vinyl chloride and another copolymerizable compound. Particularly suitable compositions are obtained with polyvinyl chloride per se as well as with the copolymers of vinyl chloride with 5 to 30% vinyl acetate or with up to about 50% vinylidene chloride. Other copolymers include a vinyl halide copolymerized with another compound containing the polymerizable group

and no other polymerizable group such as, for example, vinyl formate, vinyl acetate, vinyl propionate, vinyl butyrate, vinylidene dichloride, styrene, methyl acrylate, ethyl acrylate, butyl acrylate, methyl methacrylate, ethyl ethacrylate, allyl acetate, allyl chloride, allyl formate, vinyl chloracetate, allyl trichloracetate, methallyl acetate, chlorostyrene, dichlorostyrene, acrolein, acrylonitrile, methacrolein, methacrylonitrile, methacrylic acid, methyl vinyl ketone, methyl isopropenyl ketone, methyl vinyl ether, methyl allyl ether, and the like. It is preferred that the copolymers be derived from a mixture wherein the vinyl halide is the major constituent thereof and more preferably where it is the predominant constituent, i. e. more than 90% of the mixture. If desired, the copolymers can be obtained from the mixture of the vinyl halide with two or more other polymerizable compounds.

Other suitable vinyl halide copolymers are those obtained by copolymerizing vinyl chloride with another compound containing two of the polymerizable vinylidene groups as are present, for example, in divinyl benzene, divinyl adipate, allyl methacrylate, diallyl phthalate, etc. The divinylidene-containing compound is used in sufficiently small quantity so that the copolymer remains thermo-plastic and is not thermo-setting to an infusible resin. The amount of divinylidene-containing compound used in admixture is usually less than about 1%, to obtain a thermo-plastic polymer. When a thermo-setting polymer is desired, a larger quantity of the divinylidene-containing compound is used.

All of the thermo-plastic polymers employed in the compositions of the invention are solid materials at normal temperature (20° C.) and consequently are of high molecular weight. In general, the polymers have molecular weights of about 4,000 to 90,000.

While the treated extracts can be used alone as plasticizer for the polymer, it is desirable in many cases to employ other substances as coplasticizer with the extract. The substances used as plasticizers in combination with the acid-treated petroleum extract are esters compatible with the polymers and copolymers of a vinyl halide. By compatible is meant those esters which form homogeneous compositions with the polymer. The compatible esters which are used boil above 250° C. or above about 125° C. under 1 mm. Hg pressure. For this purpose the phosphoric acid esters of phenols and aliphatic alcohols such as tricresyl phosphate, tritolyl phosphate, trioctyl phosphate, and tributoxy ethyl phosphate are particularly suitable. The alkyl and alkoxyalkyl esters of dicarboxylic acids having the required high boiling point are also a preferred class of conjunctive plasticizers. Among representative examples of suitable esters for use in the invention are such compounds as dibutyl phthalate, di-s-butyl phthalate, diamyl phthalate, dioctyl phthalate, dibenzyl phthalate, diallyl phthalate, dimethyallyl phthalate, butyrin, dibutyl diglycollate, dibutyl adipate, dicyclohexyl phthalate, dicyclopentyl phthalate, dibutyl sebacate, dibenzyl sebacate, dioctyl fumarate, dioctyl maleate, butyl acetylricinoleate, butyl phthallyl butyl glycollate, triethylene glycol dioctanoate, dibutyl Cellosolve phthalate, dibutyl carbitol phthalate, polydiethylene glycol sebacate, and the like. Preferably, the compatible esters are those boiling above 300° C. or above about 140° C. at 1 mm. Hg pressure.

It is often desirable to use two or more esters along with the acid-treated extract in the composition of the invention. Thus, the esters of sebacic acid have the property of imparting low-freeze resistance to the compositions, but they are usually too expensive to be used solely as the ester plasticizer. By employing such an ester in minor amount along with another cheaper ester such as dioctyl phthalate or tricresyl phosphate, freeze resistance of the compositions is considerably better than with the cheaper ester alone.

The great improvement obtained by acid-treating the extracts will be evident from the following examples which, however, are given for illustrative purposes only.

*Example I*

An Edeleanu extract of a high boiling vacuum distillate from a California crude was treated. Before treatment, the extract was a dark liquid with the consistency of heavy molasses and had an initial boiling point of about 186° C. at 1 mm. Hg pressure and a final boiling point of about 281° C. at the same pressure.

About 1000 cc. of the extract was diluted with an equal volume of a hydrocarbon distillate having a boiling range of about 300 to 400° F. About 5% (based on the extract) of 95.5% sulfuric acid was added to the solution. The mixture was agitated for 10 to 15 minutes and then was settled for about 30 minutes to permit the acid sludge to separate. The solution was decanted from the sludge and the treatment was repeated twice again with additional 5% portions of fresh acid. The acid-treated solution was then heated to about 120° C. and 10% of an adsorbent clay known in the trade as Super Filtrol was added. The mixture was stirred for about 10 minutes and the clay filtered from the solution. The hydrocarbon solvent was distilled off leaving about 660 gms. (63.5% yield) of a light yellow viscous oil. The oil was redistilled under vacuum. About 43 gms. of light distillate was first removed and discarded, and then distillate was collected until a distilling temperature of 219° C. at 0.4 mm. of Hg was reached. The yield of treated and distilled extract from the redistillation operation was 88%. The properties of the product were determined and are given in the table hereinafter along with those of the products obtained as described in following Examples II and III.

Example II

Another portion of the same Edeleanu extract described in Example I was treated with dilute sulfuric acid.

About 320 cc. of the extract was dissolved in an equal volume of octane. The solution was treated with a total of about 1020 cc. of 50% sulfuric acid in five separate portions. In each case, the portion of acid was added and the mixture was stirred for 20 to 40 minutes while the temperature was about 80 to 85° C. The mixture was then allowed to settle and the acid sludge was removed. Following the acid treatment, about 10% or 33 gms. of an adsorbent clay known as Coenite was mixed with the solution with stirring for about 30 minutes at 80° C. The solution was filtered and the octane removed by distillation whereby about 274 gms. (83.2% yield) of a greenish oil was obtained.

Example III

Phosphoric acid was used to treat a third portion of the Edeleanu extract described in Example I.

About 600 gms. of the extract was diluted with an equal volume of octane. About 30 gms. of 85% phosphoric acid was added and the mixture vigorously agitated. After settling, a thick dark viscous sludge separated and was removed. The solution was treated twice again with like amounts of the phosphoric acid and was then percolated through about 60 gms. of Florida clay. After distillation to remove the octanes, about 518 gms. of dark green oil was obtained. The oil was contacted with about 5% of Super Filtrol clay at 120° C. and was then filtered. About 487 gms. (81.2% yield) of a green oil was obtained.

The properties of the oils treated as described in the foregoing examples are collected in the following table:

| Example | Original Extract | I | II | III |
|---|---|---|---|---|
| Specific Gravity, 20/4 | 1.044 | 1.019 | | 1.029 |
| Color, Union | (1) | 2 | 8+ | >8 |
| Viscosity at 100° F., centistokes | 4,740 | 811.6 | 1,133 | |
| Viscosity at 210° F., centistokes | 24.5 | 14.1 | 16.1 | |
| Carbon, per cent | 88.06 | | | |
| Hydrogen, per cent | 9.22 | | | |
| Sulfur, per cent | 1.10 | 1.30 | 1.20 | |
| Nitrogen, per cent | 1.01 | 0.06 | 0.54 | 0.57 |

[1] Almost black.

The above table shows that the treatment effects a substantial reduction in nitrogen-containing compounds from the extracts and that the greatest removal is effected with concentrated sulfuric acid. Color improvement is also best with the concentrated sulfuric acid treatment.

The acid treated extracts were used to plasticize Geon 101 (polyvinyl chloride). The plasticized polyvinyl chloride compositions were prepared by stirring together 100 parts by weight of resin, 40 parts of the extract, 40 parts of dioctyl phthalate as coplasticizer, and about 1½ parts of basic lead acetate as stabilizer. The mixture was milled out into a sheet on a heated roll mill. The milled sheet was then compression molded at about 175° C. and 1000 pounds per square inch for 1 to 2 minutes to form a test sheet.

Samples of the plasticized compositions were subjected to an accelerated aging test in order to determine the improvement gained by acid-treating the extracts. The accelerated aging test was performed by heating the molded sheets in an oven at 121° C. for 5 days.

All of the compositions before aging had substantially the same degree of flexibility which was similar to that of soft-cured kid leather. The composition plasticized with the untreated extract after aging lost its flexibility so that it became boardy in character as well as acquiring a marked brittleness. The compositions plasticized with the acid-treated extracts after the severe aging treatment were still of a flexible and pliable nature, and had not become brittle. While the relative extent of development of inflexibility and brittleness is readily observable from the samples, it is difficult to measure and describe in an absolute sense. It was observed, however, that there is a close correlation between the degree of flexibility and the value for the modulus at 100% elongation obtained according to ASTM determination: D412–41. The extent of change in hardness values was determined with a Shore A durometer. By determining the percentage change in these values before and after aging, a good indication is revealed of the striking improvement obtained by using the acid-treated extracts in comparison with the untreated extracts. Also of value in showing the retention of flexibility after aging of the composition containing the acid-treated extract, is the ultimate elongation obtained by ASTM D412–41. This test gives the amount which the sample could be stretched measured as the percentage of its length before application of stress. The table below gives the results of these tests for the compositions containing extracts treated as described in Examples I, II and III as well as those containing the untreated extract.

| Petroleum Plasticizer | Composition Aged | Ultimate Elongation, Per Cent | Modulus at 100% Elongation, lbs. per sq. in. | Percentage Change in Modulus on Aging | Shore A Hardness | Percentage Change in Hardness on Aging |
|---|---|---|---|---|---|---|
| Original Extract | No | 395 | 1,300 | | 62 | |
| Do | Yes | 175 | 2,320 | +79 | 80 | +61 |
| From Example I | No | 275 | 1,200 | | 61 | |
| Do | Yes | 355 | 1,360 | +13 | 68 | +12 |
| From Example II | No | 405 | 1,035 | | 60 | |
| Do | Yes | 350 | 1,275 | +23 | 64 | +7 |
| From Example III | No | 240 | 1,200 | | 60 | |
| Do | Yes | 390 | 1,120 | −7 | 67 | +12 |

The foregoing results clearly indicate the marked improvement in ability to withstand development of inflexibility and brittleness of the compositions of the invention that contain the acid-treated petroleum extracts as compared to compositions containing the corresponding untreated extracts. The treatment with strong mineral acids, either in dilute or concentrated form, removes some materials from the extracts that appear to be responsible for the development of inflexibility and brittleness in the polyvinyl chloride compositions.

Since many types and kinds of nitrogen-containing compounds are known to stabilize hydrocarbons against changes which occur on aging such as polymerization and gum formation, it was 24 parts of extract, 56 parts of dioctyl phthalate and 1½ parts of basic lead silicate. The materials were milled together and rolled out into a sheet which was compression molded for testing. Samples were subjected to the accelerated aging test. The superior resistance of the compositions containing the acid-treated furfural extracts of petroleum are seen from the results of the tests given in the following table:

| Petroleum Plasticizer | Composition Aged | Ultimate Elongation, Per Cent | Modulus at 100% Elongation, lbs. per sq. in. | Percentage Change in Modulus on Aging | Shore A Hardness | Percentage Change in Hardness on Aging |
|---|---|---|---|---|---|---|
| Original | No | 305 | 850 | | 54 | |
| Do | Yes | 50 | Undeterminable[1] | | 78 | +44 |
| Acid-Treated | No | 290 | 1,000 | | 60 | |
| Do | Yes | 425 | 750 | −25 | 58 | −3 |

[1] Since the composition plasticized containing the original became so inflexible after aging that it broke after an elongation of only 50%, it was impossible to determine the modulus at 100% elongation.

unexpected and surprising that a treatment of the extract which would effect a substantial reduction of nitrogen-containing compounds, as is the case in treating the petroleum extract with the strong mineral acids, would give a material having a better stability towards aging than the original extract. Furthermore, the improvement in stability is not peculiar to the particular source of petroleum from which the extract is derived (an extract from a California petroleum distillate was used in the foregoing examples), nor the particular non-reactive, highly polar solvent used to obtain the original petroleum extract (sulfur dioxide was used as solvent to obtain the extract treated in Examples I, II and III) as will be evident from the following examples.

Example IV

A furfural extract of a bulk distillate from a California crude was treated. The extract was an almost solid, brownish material.

About 298 gms. of the extract was dissolved in 496 gms. of a light hydrocarbon solvent containing about 60% aromatics with a boiling range of about 245 to 325° F. The solution was given four separate treatments with 5% by weight (based on the extract) of 95.5% sulfuric acid. In each treatment, the acid was added and the mixture vigorously agitated. The mixture was then allowed to settle and the oil solution was decanted from the settled acid sludge. After the acid treatment, the oil was percolated through about 394 gms. of fuller's earth, washed with dilute caustic as well as with water and again percolated through the same clay. The solvent was removed by distillation and the oil was contacted for about 15 minutes with 5% by weight of Super Filtrol at 130° C. The clay was filtered from the mixture and a reddish orange oil was obtained in a yield of about 51%.

The results from determination of some properties of the treated extract along with those of the original extract are tabulated below:

| Extract | Original | Acid-Treated |
|---|---|---|
| Viscosity at 100° F., centistokes | | 10,260 |
| Viscosity at 210° F., centistokes | 292 | 51 |
| Nitrogen, per cent | 1.18 | 0.23 |

Polyvinyl chloride was plasticized with the treated and untreated extracts in a manner like that described in the foregoing examples. For each 100 parts by weight of resin, there was used

Example V

Treatment was made on a blend of Duo-Sol extracts obtained by double solvent extraction of vacuum distillate as well as distillate residue from a Mid-Continent crude with cresylic acid and propane. The extract predominated in extract of vacuum distillate with only a minor proportion of extract from residue. The extract blend was a brownish viscous oil which began to boil at about 208° C. under 1 mm. Hg pressure and 80% distilled over up to 282° C. under the same pressure.

About 865 gms. of the extract was dissolved in 1 liter of octane and the solution was given three treatments with 5% of 95.5% sulfuric acid, the mixture being agitated and the acid sludge allowed to settle, and the oily solution decanted from the sludge each time. The solution was percolated through about 429 gms. of fuller's earth. The diluent was removed by distillation from the treated extract whereby about 578 gms. of greenish red oil was obtained which was contacted with 5% of Super Filtrol clay at 120° C. The clay was removed by filtration and about 510 gms. of product was obtained.

The properties of the treated extract in comparison with the original extract are shown in the table below:

| Extract | Original | Acid-Treated |
|---|---|---|
| Color, Union | (¹) | 5+ |
| Viscosity at 100° F., centistokes | 5,800 | 1,283 |
| Viscosity at 210° F., centistokes | 38 | 22 |
| Nitrogen, per cent | 0.52 | 0.04 |

[1] Reddish brown.

The acid-treated petroleum extract was compounded with polyvinyl chloride using dioctyl phthalate as a coplasticizer and basic lead acetate as stabilizer, the proportions and procedure being the same as described in Examples I, II and III. A sample of the compression molded, milled sheet was subjected to the accelerated aging test and then the tests for ultimate elongation and hardness were made thereon together with corresponding tests with the composition containing the original extract. As will be noted from the results in the table below, the composition containing the untreated original extract had become so inflexible after aging that the sample broke after only 75% elongation so it was impossible to determine the modulus at 100% elongation or the percentage change in modulus after aging.

| Petroleum Plasticizer | Composition Aged | Ultimate Elongation, Per Cent | Modulus at 100% Elongation, lbs. per sq. in. | Percentage Change in Modulus on Aging | Shoro A Hardness | Percentage Change in Hardness on Aging |
|---|---|---|---|---|---|---|
| Original | No | 275 | 900 | | 54 | |
| Do | Yes | 75 | undeterminable. | | 88 | +39 |
| Acid-Treated | No | 200 | 970 | | 60 | |
| Do | Yes | 250 | 1,190 | +23 | 60 | 0 |

The compositions of the invention are plastic solids which are non-flowable at room temperature (20° C.), i. e., they will not flow under their own weight when coated on a flat surface which is subsequently inverted. While the compositions are of a non-fluid character, they vary from substantially rigid materials to flexible and pliable solids. In general, the greater proportion of plasticizer contained in the compositions, the more plastic are the compositions. The flexible and pliable compositions display elastic properties which make them particularly useful for many applications. I am aware that various low and medium boiling hydrocarbons have heretofore been suggested for use as solvents for polymers of vinyl halides. Such hydrocarbons, because of their large or appreciable volatility, are used only as a vehicle for making fluid compositions like lacquers, and these hydrocarbons are lost by evaporation upon application of the solution to surfaces. The acid-treated petroleum extracts contained in the compositions of the invention, on the other hand, are substantially non-volatile and are not lost therefrom by evaporation when the compositions are used at ordinary atmospheric temperatures. Nevertheless, it is sometimes desirable to use compositions obtained by compounding the resin with the extract and to have in addition thereto volatile hydrocarbons including volatile extracts which will evaporate from the composition. Such compositions are quite useful in various applications of the compositions of the invention.

The compositions of the invention may be compounded in any suitable manner whereby the resin, acid-treated petroleum extract and ester plasticizer, if any, are mixed together so that a homogeneous mixture is obtained. For this purpose, the use of a heated roll mill or Banbury mixer is suitable. If desired, the various ingredients may be dissolved in solvents, the solutions may be mixed and the solvents evaporated therefrom in order to obtain the plasticized compositions.

Various other ingredients may be incorporated into the compositions such as stabilizers, pigments, fillers and other compounding agents. Stabilizers for the vinyl halide polymers like basic lead silicate, soaps like cadmium, lead or calcium stearate, tetraphenyl lead or tin, are desirably incorporated. For the purpose of coloring the compositions, various pigments like red lead, titanium dioxide, zinc oxide, lead chromate, etc., may be used, as well as carbon black, and the like.

The amount of ester coplasticizer used in conjunction with the acid-treated extract can be varied to meet the needs for which the invention is put. Excellent general property compositions are obtained by the use of 25 to 70% extract in the total plasticizer which amounts to 0.5 to 1 part per part of resin. Such compositions are very useful as insulating materials for coating electric conductors. The compositions containing sufficient plasticizer to be very flexible are also useful for coating conductors, tubes and tanks. The more rigid plastic compositions which contain less plasticizer can be used in molding or forming various articles. Attractive products are also prepared by impregnating paper, fabrics and glass cloth with the compositions of the invention.

I claim as my invention:

1. A plastic composition which comprises a thermoplastic polymer composed essentially of vinyl halide units and containing only the amount of halogen contained in the polymer as formed by the polymerization of the monomer units, plasticized with a mixture comprising an ester compatible with said polymer and boiling above about 125° C. at 1 mm. Hg pressure and a petroleum product boiling above 300° C. at 760 mm. Hg pressure but below 400° C. at 1 mm. Hg pressure, said plastic composition containing 0.5 to 1 part by weight of total plasticizer per part of said thermoplastic polymer and 25 to 70% by weight of said petroleum product in the total plasticizer, said petroleum product having been obtained by diluting each volume of an Edeleanu extract of a distillate of a petroleum selected from the group consisting of naphthenic and aromatic crudes with from one to two volumes of a hydrocarbon solvent boiling below 300° C., introducing into the diluted extract as a treating agent sulfuric acid containing less than 50% water in an amount sufficient to provide from about 5 to 30 parts of acid treating agent per 100 parts of undiluted extract thereby forming an acid sludge and an acid-extracted layer, separating the acid-extracted layer from the acid sludge, repeating the said steps of introducing acid and extracting until the nitrogen content of the original extract has been reduced by at least 43.5%, neutralizing the diluted extract by contacting it with an adsorbent bleaching clay and distilling off the materials boiling below 300° C., the total acid treating agent added being at least 15 parts per 100 parts of undiluted extract treated.

2. A plastic composition which comprises a thermoplastic polymer composed essentially of vinyl chloride units and containing only the amount of halogen contained in the polymer as formed by the polymerization of the monomer units, plasticized with a mixture comprising an ester compatible with said polymer and boiling above about 125° C. at 1 mm. Hg pressure and a petroleum product boiling between about 125° C. and 300° C. at 1 mm. Hg pressure, said plastic composition containing 0.5 to 1 part by weight of total plasticizer per part of said thermoplastic polymer and 25 to 70% by weight of said petroleum product in the total plasticizer, said petroleum product having been obtained by diluting each volume of an Edeleanu extract of a distillate of a petroleum selected from the group consisting of naphthenic and aromatic crudes with from one to two volumes of a hydrocarbon solvent boiling below 300° C., introducing into the diluted extract as a treating agent sulfuric acid containing less than 50% water in an amount sufficient to provide from about 5 to 30 parts of acid treating agent per 100 parts of undiluted extract thereby forming an acid sludge and an acid-extracted layer, separating the acid-extracted layer from the acid sludge, repeating the steps of introducing acid and extracting until the nitrogen content of the original extract has been reduced by at least 43.5%, neutralizing the diluted extract by contacting it with an adsorbent bleaching clay and distilling off the materials boiling below 300° C., the total acid treating agent added being at least 15 parts acid treating agent per 100 parts of undiluted extract treated.

3. A plastic composition which comprises a thermoplastic polymer composed essentially of vinyl chloride units and containing only the amount of halogen contained in the polymer as formed by the polymerization of the monomer units, plasticized with a mixture comprising a compatible dialkyl ester of a dicarboxylic acid boiling above about 125° C. at 1 mm. Hg pressure and a petroleum product boiling between about 125° C. and 300° C. at 1 mm. pressure, said plastic composition containing 0.5 to 1 part by weight of total plasticizer per part of polyvinyl chloride and 25 to 70% by weight of petroleum product in the total plasticizer, said petroleum products having been obtained by diluting each volume of an Edeleanu extract of a distillate of a petroleum selected from the group consisting of naphthenic and aromatic crudes with from one to two volumes of a hydrocarbon solvent boiling below 300° C., introducing into the diluted extract as a treating agent sulfuric acid containing less than 50% water in an amount sufficient to provide from about 5 to 30 parts of acid treating agent per 100 parts of undiluted extract thereby forming an acid sludge and an acid-extracted layer, separating the acid-extracted layer from the acid sludge, repeating the said steps of introducing acid and extracting until the nitrogen content of the original extract has been reduced by at least 43.5%, neutralizing the diluted extract by contacting it with an adsorbent bleaching clay and distilling off the materials boiling below 300° C., the total acid treating agent added being at least 15 parts per 100 parts of undiluted extract treated.

4. A plastic composition which comprises a thermoplastic polymer composed essentially of vinyl chloride units and containing only the amount of halogen contained in the polymer as formed by the polymerization of the monomer units plasticized with a mixture comprising a compatible dialkyl ester of a dicarboxylic acid boiling above about 125° C. at 1 mm. Hg pressure and a petroleum product boiling between about 125° C. and 300° C. at 1 mm. pressure, said plastic composition containing 0.5 to 1 part by weight of total plasticizer per part of polyvinyl chloride and 25 to 70% by weight of petroleum product in the total plasticizer, said petroleum products having been obtained by diluting each volume of an Edeleanu extract of a distillate of a petroleum selected from group consisting of naphthenic and aromatic crudes with one volume of a mixture of hydrocarbons boiling between 300° and 400° F., introducing into the diluted extract 5 parts of 95.5% sulfuric acid (based upon the weight of extract) thereby forming an acid sludge and an acid-extracted layer, separating the acid-extracted layer from the acid sludge, repeating the steps of introducing the acid and extracting two additional times thereby reducing the nitrogen content of the original extract by at least 43.5% and neutralizing the acid-extracted layer by introducing 10% by weight of adsorbent clay, filtering off the clay and distilling off the materials boiling below 300° C.

AUGUST A. SCHAERER.

REFERENCES CITED

The following references are of record in the file of this patent:

UNITED STATES PATENTS

| Number | Name | Date |
| --- | --- | --- |
| 2,210,434 | Rosenthal | Aug. 6, 1940 |
| 2,220,531 | Lazar | Nov. 5, 1940 |

FOREIGN PATENTS

| Number | Country | Date |
| --- | --- | --- |
| 562,956 | Great Britain | July 24, 1944 |

OTHER REFERENCES

Kalichevsky et al., Chemical Refining of Petroleum, Chemical Catalog Co., 1933, pp. 82, 83, 91, 168, and 169.

"Plastics Catalog," 1943 (Plastics Catalogue Corp., N. Y.), pp. 209 and 210.